Patented Apr. 14, 1953

2,635,067

UNITED STATES PATENT OFFICE 2,635,067

ALGINATE PASTES

Arnold B. Steiner, La Jolla, and Lloyd B. Rothe, San Diego, Calif., assignors to Kelco Company, San Diego, Calif., a corporation of Delaware No Drawing. Application January 27, 1950, Serial No. 140,946

16 Claims. (Cl. 167—63)

This invention relates to the manufacture of pharmaceutical ointments, cosmetic and lubricating pastes and the like by reaction between water-soluble salts of alginic acid, such as sodium or ammonium alginate, and certain salts, such as those of calcium, which yield water-insoluble salts with alginic acid.

A purpose of the invention is to produce algin pastes having a salve-like consistency, free from lumps or granularity, readily spreading to a smooth, thin film.

A purpose of the invention is to produce algin pastes ranging in consistency from that of a highly viscous semiliquid to that of a paste which is firm but not elastic or rubbery.

A purpose of the invention is to produce algin pastes which are free from tendency to bleed, either before or after application.

A purpose of the invention is to produce algin pastes which are stable at the highest temperatures to which they may be subjected during storage in hot climates and which have an extended shelf life.

The soluble alginates have been widely used in the production of gels for many different purposes. These gels range in consistency from tender jellies adapted to use as desserts, through the semi-rigid candy jellies to the tough and elastic dental gels. While the methods of preparation are diverse they have four features in common: (a) the coagulating (e. g., calcium) salt used is always very slightly soluble or insoluble in water; (b) the salt is always dissolved in a preformed or already existing solution of the algin; (c) the reaction must always proceed very slowly to avoid the precipitation of curdy masses and in most instances must be retarded by the addition of a buffer, and (d) the product is always a jelly rather than a paste.

The products of these methods are in all cases consistent, massive and more or less elastic and are poorly adapted to the fabrication of unguents, ointments, salves and the like by reason of their lack of spreadability. When these products are so highly dilute as to be no more than viscous liquids they are readily spread to form a liquid film, but when brought to even that slight degree of firmness necessary to prevent flow from an uncapped tube or an overturned jar they are spread only with considerable difficulty, breaking down to lumps or granules rather than to a smooth, adherent and stable film.

We have departed from the practice of the prior art in two major respects: first, in using a readily soluble rather than a slightly soluble or insoluble coagulating salt; second, in bringing the coagulating salt into aqueous solution before the alginate in dry form is added to it. This is the exact reversal of the prior procedure in which the calcium salt is added to a solution of the soluble alginate, and this reversal has been found to produce highly desirable results:

A. The reaction occurs as rapidly as the alginate can pass into solution, and as the presence of the dissolved calcium salt practically inhibits clumping (which strongly retards the solution of the soluble alginates in water) a batch may be completed in minutes rather than in hours as heretofore;

B. The firmness of the finished product is under complete control, by varying the relation between algin, calcium salt and water;

C. The final consistency of the product is developed immediately, in the brief time required for the algin to pass into solution, so that its suitability for the intended use can be ascertained immediately (without waiting to see whether any further change takes place) and so that any error in proportions may be corrected. In the procedures using insoluble or slightly soluble calcium salts, the consistency may increase for days after the completion of a batch;

D. Clotting and granulation of the product are avoided and the finished batch is free from lumps and is homogeneous;

E. The product does not bleed (separate water) after spreading and, in consequence, the drying out of the spread film is very much retarded;

F. The product is formed by progressive thickening (increase in viscosity) as the algin passes into solution, making it possible to select the most favorable moment for the incorporation of an insoluble component such as an oil phase or a solid suspensoid;

G. The product has exceptional stability to maximum atmospheric temperatures and to storage, particularly as compared with extremely viscous solutions of the alginates alone;

H. The product has exceptional stability to low pH conditions, a highly valuable property in the fabrication of ointments, which are ordinarily kept on the acid side of the scale.

The primary advantage in the new process, however, lies in the novel physical structure of its product and in its adaptability to the specific uses contemplated herein. Instead of being a jelly which resists spreading so long as it has any firmness whatever, the new product is a short, buttery, salve-like paste over a range from a high degree of firmness down to a state of fluency. This salve-like structure, which would render the product useless for most of the purposes of the prior art, adapts it particularly to the instant use and distinguishes it sharply from the earlier products.

The alginic materials available for use in this process include all of the water-soluble salts of alginic acid, to-wit: the alginates of the alkali metals, magnesium, ammonium, the amines and the alkylolamines, together with the glycol alginates.

The coagulating salts available are such of the salts of the alkaline-earth metals (other than magnesium), of aluminum and of the heavy metals, as have sufficient solubility in water at the operating temperature to permit the required quantity of the salt to be completely dissolved in the quantity of water used in making the batch. The desired result will not be obtained if a part only of the salt is in solution and the remainder in suspension. For practical reasons, the minimum solubility of the salt should be about 1 gram per 100 ml. water, there being no upper limit to solubility. In selecting a salt the percentage solubility at 20° C. may be used as a guide, with the reservation that if the acidity, alkalinity or elevated temperature of the water increases the solubility of the salt, a salt of correspondingly lower solubility at 20° C. may be used.

Obviously, the characteristics of the metal of the salt (toxicity, color, etc.) must be considered in making a selection, but all of those above named are functional.

For cosmetic and pharmaceutical purposes the salts of calcium are usually to be preferred, and of these we have available the acetate, benzoate, chloride, lactate, nitrate, nitrite, propionate, salicylate and numerous metallo-organic salts ranging in solubility from 2.67 grams to 100 grams per 100 ml. To obtain the greatest stability we prefer to use salts of organic acids, said acids having dissociation constants not exceeding $1.55 \times 10^{-4}$ where such salts are sufficiently soluble, and specifically, in the order named, the salts of benzoic, lactic and acetic acids. The relatively insoluble calcium salts such as the carbonate, citrate, diphosphate, sulfate and tartrate, having solubilities ranging from 0.02 to 0.30 gram per 100 ml. are not available for use in this process, the results produced with them being not materially different from those produced by the use of the same agents in the methods of the prior art.

The first step in the process is to bring the coagulating (e. g., calcium) salt into aqueous solution. The concentration of salt in this solution may vary over a wide range but is always of a rather low order. This variation will follow from the concentration of the algin which it is proposed to use, the equivalent weight of the salt, and also the firmness required in the finished product, the degree of firmness being controlled in part by the viscosity-producing characteristic of the particular algin selected and in part by the quantitative relation between salt and algin.

The experiments recorded below show salt concentrations ranging from 0.01% to 0.62% and it is probable that the concentration of salt in the aqueous solution will seldom if ever exceed about 2% by weight. However, the concentration of the salt solution is not an arbitrary limitation but follows from the quantitative relations between water and soluble alginate and between alginate and salt required to yield a product having the desired firmness.

As soon as the salt solution is ready, the algin is added, in powered, granular or fibrous form as may be convenient. As the algins are readily soluble when not allowed to clump, and as the presence of the salt in solution greatly facilitates dispersion, only gentle stirring is required and paste formation proceeds rapidly. Desired additives such as oils, powders, perfumes, coloring matters and the like are introduced and stirred into the batch at such stage in the progressive thickening as may be most favorable to their dispersion and suspension, and stirring is continued until the algin has completely dissolved, at which time the batch will be complete and no further change in consistency will occur.

The relation between algin and water is subject to considerable variation with differences in the viscosity-producing characteristics of the particular algin used and in the consistency required in the final product, and to a lesser extent with differences between the various coagulating salts. The experiments recorded in the table below were conducted within the range from 1.5% to 3.0% algin concentration, as referred to the total weight of the batch, but under some conditions, as with an algin of very high viscosity, good results may be obtained with as little as 0.5% or, with an algin of very low viscosity, with as much as 10%.

The following table shows the results obtained in the use of three different algins with four different calcium salts over wide ranges of relation between algin and salt. In this table:

Column 1 shows the weight percentage of the named algin in the batch;

Column 2 shows the quantity of the given salt actually used, in percentage of weight of algin;

Column 3 converts the figures of column 2 to grams per 100 grams solution;

Column 4 shows the theoretical salt requirement, in grams, i. e., the quantity of that particular salt required to combine completely with the quantity of algin noted in column 1;

Column 5 shows the percentage relation between the theoretical requirement and the quantity of the salt actually used in the experiment, and Column 6 describes the product of the experiment.

Table 1

SODIUM ALGINATE WITH CALCIUM CHLORIDE

| 1—Algin, Percent | 2—Salt, Percent | 3—Salt, Grams | 4—Salt, Reqmnt. | 5—Salt, Percent of Req. | 6—Product |
|---|---|---|---|---|---|
| 3.0 | 1.7 | .051 | .750 | 6.8 | Soft paste. |
| 3.0 | 4.7 | .141 | .750 | 18.9 | Firm paste. |
| 3.0 | 7.0 | .210 | .750 | 28.0 | Semifluid. |
| 3.0 | 10.0 | .300 | .750 | 40.0 | Fluid. |

FIBROUS SODIUM ALGINATE WITH CALCIUM CHLORIDE

| 1—Algin, Percent | 2—Salt, Percent | 3—Salt, Grams | 4—Salt, Reqmnt. | 5—Salt, Percent of Req. | 6—Product |
|---|---|---|---|---|---|
| 2.5 | 0.5 | .0125 | .625 | 2.0 | Soft paste. |
| 2.5 | 1.0 | .025 | .625 | 4.0 | Firm paste. |
| 2.5 | 3.0 | .075 | .625 | 12.0 | Do. |
| 2.5 | 6.0 | .150 | .625 | 24.0 | Soft, grainy. |
| 2.5 | 10.0 | .300 | .625 | 48.0 | Do. |

PROPYLENE GLYCOL ALGINATE WITH CALCIUM CHLORIDE

| 1—Algin, Percent | 2—Salt, Percent | 3—Salt, Grams | 4—Salt, Reqmnt. | 5—Salt, Percent of Req. | 6—Product |
|---|---|---|---|---|---|
| 2.0 | 0.5 | .010 | .427 | 2.3 | Soft paste. |
| 2.0 | 1.0 | .020 | .427 | 4.7 | Fairly firm. |
| 2.0 | 2.0 | .040 | .427 | 9.4 | Firm. |
| 2.0 | 3.0 | .060 | .427 | 14.1 | Soft. |
| 2.0 | 6.0 | .120 | .427 | 28.1 | Thin. |
| 2.0 | 12.0 | .240 | .427 | 56.2 | Thin, grainy. |

SODIUM ALGINATE WITH CALCIUM BENZOATE

| 1—Algin, Percent | 2—Salt, Percent | 3—Salt, Grams | 4—Salt, Reqmnt. | 5—Salt, Percent of Req. | 6—Product |
|---|---|---|---|---|---|
| 1.5 | 5.0 | .075 | 1.137 | 6.6 | Soft paste. |
| 1.5 | 10.0 | .150 | 1.137 | 13.3 | Do. |
| 1.5 | 15.0 | .225 | 1.137 | 19.9 | Fluent paste. |
| 1.5 | 20.0 | .300 | 1.137 | 26.5 | Fluid. |

PROPYLENE GLYCOL ALGINATE WITH CALCIUM BENZOATE

| 1—Algin, Percent | 2—Salt, Percent | 3—Salt, Grams | 4—Salt, Reqmnt. | 5—Salt, Percent of Req. | 6—Product |
|---|---|---|---|---|---|
| 2.0 | 5.0 | .100 | 1.302 | 7.7 | Thick solution. |
| 2.0 | 10.0 | .200 | 1.302 | 15.4 | Soft paste. |
| 2.0 | 15.0 | .300 | 1.302 | 23.0 | Do. |
| 2.0 | 20.0 | .400 | 1.302 | 30.7 | Do. |

SODIUM ALGINATE WITH CALCIUM LACTATE

| 1—Algin, Percent | 2—Salt, Percent | 3—Salt, Grams | 4—Salt, Reqmnt. | 5—Salt, Percent of Req. | 6—Product |
|---|---|---|---|---|---|
| 3.0 | 2.0 | .060 | 2.073 | 2.9 | Firm paste. |
| 3.0 | 5.0 | .150 | 2.073 | 7.2 | Do. |
| 3.0 | 8.0 | .240 | 2.073 | 11.6 | Softer. |
| 3.0 | 10.0 | .300 | 2.073 | 14.5 | Do. |
| 3.0 | 12.0 | .360 | 2.073 | 17.4 | Thin paste. |
| 3.0 | 15.0 | .450 | 2.073 | 21.7 | Do. |

FIBROUS SODIUM ALGINATE WITH CALCIUM LACTATE

| 1—Algin, Percent | 2—Salt, Percent | 3—Salt, Grams | 4—Salt, Reqmnt. | 5—Salt, Percent of Req. | 6—Product |
|---|---|---|---|---|---|
| 2.5 | 1.0 | .025 | 1.728 | 1.4 | Soft, fluent. |
| 2.5 | 2.0 | .050 | 1.728 | 2.9 | Soft paste. |
| 2.5 | 5.0 | .125 | 1.728 | 7.2 | Fairly firm. |
| 2.5 | 8.0 | .200 | 1.728 | 11.6 | Firm paste. |
| 2.5 | 10.0 | .250 | 1.728 | 14.5 | Rubbery gel. |
| 2.5 | 15.0 | .375 | 1.728 | 21.7 | Firm gel. |
| 2.5 | 25.0 | .625 | 1.728 | 36.2 | Grainy paste. |

PROPYLENE GLYCOL ALGINATE WITH CALCIUM LACTATE

| 1—Algin, Percent | 2—Salt, Percent | 3—Salt, Grams | 4—Salt, Reqmnt. | 5—Salt, Percent of Req. | 6—Product |
|---|---|---|---|---|---|
| 2.0 | 2.0 | .040 | 1.184 | 3.4 | Soft paste. |
| 2.0 | 5.0 | .100 | 1.184 | 8.6 | Fairly firm. |
| 2.0 | 8.0 | .160 | 1.184 | 13.7 | Firm paste. |
| 2.0 | 10.0 | .200 | 1.184 | 17.1 | Do. |
| 2.0 | 12.0 | .240 | 1.184 | 20.3 | Grainy paste. |
| 2.0 | 15.0 | .300 | 1.184 | 25.3 | Do. |

FIBROUS SODIUM ALGINATE WITH CALCIUM ACETATE

| 1—Algin, Percent | 2—Salt, Percent | 3—Salt, Grams | 4—Salt, Reqmnt. | 5—Salt, Percent of Req. | 6—Product |
|---|---|---|---|---|---|
| 2.5 | 1.0 | .025 | .888 | 2.8 | Soft paste. |
| 2.5 | 3.0 | .075 | .888 | 8.4 | Firm paste. |
| 2.5 | 5.0 | .125 | .888 | 14.1 | Do. |
| 2.5 | 10.0 | .250 | .888 | 28.2 | Soft. |
| 2.5 | 15.0 | .375 | .888 | 42.2 | Soft, grainy. |

PROPYLENE GLYCOL ALGINATE WITH CALCIUM ACETATE

| 1—Algin, Percent | 2—Salt, Percent | 3—Salt, Grams | 4—Salt, Reqmnt. | 5—Salt, Percent of Req. | 6—Product |
|---|---|---|---|---|---|
| 2.0 | 1.0 | .020 | .613 | 3.3 | Soft paste. |
| 2.0 | 3.0 | .060 | .613 | 9.8 | Fairly firm. |
| 2.0 | 5.0 | .100 | .613 | 16.3 | Firm. |
| 2.0 | 7.0 | .140 | .613 | 22.8 | Do. |
| 2.0 | 10.0 | .200 | .613 | 32.6 | Soft. |

All of the experiments recorded in those parts of the above table above the dividing lines in column 6 were considered successful, in that they yielded products having the desired short, pasty consistency, the firmness of the product increasing with enhanced proportion of salt up to this level. Beyond this point the firmness of the product tends to decrease, the grain of the paste becoming progressively coarser with loss of homogeneity. With excessively large proportions of salt the product is reduced to a mass of granules of gel suspended in water or in a dilute solution of algin.

This observation is of much practical importance, the products obtained with less than the maximum salt proportion (the proportion which produces the maximum firmness) being of better quality than products of the same firmness produced with the use of more than the maximum proportion of the salt. It is therefore highly desirable, in the working out of a new formulation, to first determine by experiment the relation of salt to algin which gives the firmest product and, if this be too firm for the intended use, to reduce the salt proportion rather than to increase it.

The experiments recorded in Table 1 indicate the production of maximum firmness with a relation of salt to algin ranging, in most instances, between about 10% and about 20% of the stoichiometric quantity. This, however, does not establish a firm limitation as the maximum may readily be exceeded in the use of other algins and other salts, as for example in the combination of propylene glycol alginate with calcium benzoate.

A procedure which is ordinarily though not always or strictly alternative to that above described consists in adding the powdered reactants simultaneously to the required quantity of water. Assuming the salt to be sufficiently water-soluble, it will pass into solution so much more rapidly than the algin that the latter is effectively dispersed in a preformed solution of the salt. This, of course, is the opposite of what occurs when a mixture of an algin with a very slightly soluble or insoluble salt is stirred into water. Calcium citrate, for example, is so slowly soluble that the solid alginate will have passed into solution before any material quantity of the salt dissolves, while calcium alginate passes into solution only after it has interchanged calcium for sodium ions with the sodium alginate.

While this alternative method is sometimes convenient, it should be emphasized that it can be used with satisfaction only when the salt selected is considerably more rapidly soluble than the type of alginate employed. The difference in solubility in favor of the salt may be increased by selecting a granular rather than a fibrous form of the algin, by reducing the dry salt to the finest possible particle size, and by such vigorous blending of the dry solids as to effect the coating of the alginate granules with a layer of salt powder.

The extent to which the desired properties of pasty or salve-like consistency, ready spreadability and stability in storage and at elevated atmospheric temperatures are developed in the products of the new process, and also the wide range of coagulating agents available, are illustrated by the experiments of which the results are recorded in Table 2 below. These experiments were made in groups of three, the "A" series following the method above described, of dissolving the salt in water and stirring the algin into the solution in the form of a dry powder. The "B" series followed one method of the prior art, of dissolving the alginate in water and adding the salt as a dry powder. The "C" series followed another prior art method, consisting in dissolving the algin in water and adding the salt in the form of a thin aqueous slurry.

The batches each contained 7.5 grams of the named alginate, the quantity of salt named opposite each in the table, and sufficient water to bring the weight of the batch to 300 grams. The batches were stirred mechanically and at the same speed until the powdered component had dissolved, the average time for the "A" series batches being about twenty minutes and for the "B" and "C" batches about four hours.

After the lapse of several days during which the product samples were held at room temperature in order to permit the "B" and "C" samples to come to equilibrium, the properties of the products were noted, as recorded in the lines "A-1", "B-1" and "C-1" of the table. Samples of each product were then maintained at a uniform temperature of 110–120° F. for varying periods and, after cooling, were again observed and any change in properties noted in the lines "A-2", "B-2" and "C-2" of the table.

The appearance of the product is noted only where it varied from the rule that the products are hazy by transmitted light, the "B" and "C" samples being, as a rule, clearer than the "A," and that the reflection from a free surface of the "A" products is characteristically dull (matte) and from the "B" and "C" products is bright.

Table 2

1. SODIUM ALGINATE+ALUMINUM NITRATE—15% OF THEORETICAL

| Test No. | Heat, Days | Spread | Firmness | Resilience | Structure |
|---|---|---|---|---|---|
| A-1 | 0 | Sl. Grainy | Firm, soft | Slight | Homogeneous paste. |
| B-1 | 0 | Lumpy | do | High | Curdy lumps. |
| C-1 | 0 | do | do | do | Do. |
| A-2 | 25 | | Thick liquid | | Homogeneous. |
| B-2 | 14 | | Thin liquid | | Separated. |
| C-2 | 14 | | do | | Do. |

2. SODIUM ALGINATE+CALCIUM GLUCONATE—15% OF THEORETICAL

| Test No. | Heat, Days | Spread | Firmness | Resilience | Structure |
|---|---|---|---|---|---|
| A-1 | 0 | Smooth | Firm | Slight | Homogeneous paste. |
| B-1 | 0 | Lumpy | Chunky | High | Homogeneous jelly. |
| C-1 | 0 | Granular | do | do | Do. |
| A-2 | 40 | Smooth | Firm, soft | V. Slight | Homogeneous paste. |
| B-2 | 40 | Granular | Harder than A | Moderate | Homogeneous jelly. |
| C-2 | 40 | do | do | High | Do. |

Comparison of the above results illustrates the general observation that salts of a weak acid with a strong base yield much more stable products than salts of a strong acid with a weak base.

*Table 2*—Continued

3. SODIUM ALGINATE+CALCIUM SALICYLATE—15% OF THEORETICAL

| Test No. | Heat, Days | Spread | Firmness | Resilience | Structure |
|---|---|---|---|---|---|
| A-1 | 0 | Smooth | Firm | Moderate | Homogeneous paste. |
| B-1 | 0 | Lumpy | Harder | High | Homogeneous jelly. |
| C-1 | 0 | ---do--- | ---do--- | ---do--- | Do. |
| A-2 | 40 | Smooth | Firm | Moderate | Homogeneous paste. |
| B-2 | 40 | Lumpy | ---do--- | High | Slight water separation. |
| C-2 | 40 | None, lumps | Soft | ---do--- | Some flocculation. |

All of these products were highly stable, the breakdown of the A sample being zero and of the B and C samples slight.

4. SODIUM ALGINATE+COPPER SULFATE—7.5% OF THEORETICAL

| Test No. | Heat, Days | Spread | Firmness | Resilience | Structure |
|---|---|---|---|---|---|
| A-1 | 0 | Smooth | Firm | Moderate | Homogeneous paste. |
| B-1 | 0 | Stringy | Fluent | | Blob of gel. |
| C-1 | 0 | ---do--- | Soft | High | Some flocculation. |
| A-2 | 32 | Granular | Firm | Low | Homogeneous paste. |
| B-2 | 32 | | Liquid | | Homogeneous liquid. |
| C-2 | 32 | | ---do--- | | Separated. |

5. SODIUM ALGINATE+COPPER LACTATE—3.7% OF THEORETICAL

| Test No. | Heat, Days | Spread | Firmness | Resilience | Structure |
|---|---|---|---|---|---|
| A-1 | 0 | Smooth | Firm, soft | Slight | Homogeneous paste. |
| B-1 | 0 | Stringy | Tough | High | Homogeneous jelly. |
| C-1 | 0 | | | | |
| A-2 | 40 | Smooth | Soft | None | Slight lumpiness. |
| B-2 | 40 | | Fluent | | Free water separated. |
| C-2 | 40 | | | | |

6. SODIUM ALGINATE+FERROUS CHLORIDE—15% OF THEORETICAL

| Test No. | Heat, Days | Spread | Firmness | Resilience | Structure |
|---|---|---|---|---|---|
| A-1 | 0 | Smooth | Soft | Slight | Homogeneous paste. |
| B-1 | 0 | | Fluent | | Curdy precipitate. |
| C-1 | 0 | Smooth | Very soft | | Flocculent precipitate. |
| A-2 | 25 | ---do--- | ---do--- | Slight | Homogeneous paste. |
| B-2 | 25 | | Fluent | | Curdy precipitate. |
| C-2 | 25 | | Liquid | | Flocculent precipitate. |

None of these samples were very stable, the B and C being less stable than the A. A yellow cloud of iron oxide separated on heating the A and B samples and a heavy floc from the C sample.

7. MERCURIC ACETATE+SODIUM ALGINATE—15% OF THEORETICAL

| Test No. | Heat, Days | Spread | Firmness | Resilience | Structure |
|---|---|---|---|---|---|
| A-1 | 0 | Smooth | Firm | Moderate | Homogeneous paste. |
| B-1 | 0 | Stringy | Very soft | ---do--- | Blob of gel. |
| C-1 | 0 | None, lumps | Tough | High | Homogeneous jelly. |
| A-2 | 32 | Smooth | Very soft | Slight | Homogeneous paste. |
| B-2 | 32 | | Fluent | | Blob of gel. |
| C-2 | 32 | Lumpy | Very soft | Slight | Granular. |

The A sample lost somewhat in firmness but did not separate on heating; the B sample was not homogeneous when made and the external phase was liquefied by decomposition of the algin; the C sample separated when heated.

8. SODIUM ALGINATE+SILVER NITRATE—7.5% OF THEORETICAL

| Test No. | Heat, Days | Spread | Firmness | Resilience | Structure |
|---|---|---|---|---|---|
| A-1 | 0 | Smooth | Firm | Moderate | Homogeneous paste. |
| B-1 | 0 | None, lumps | Tough | High | Homogeneous jelly. |
| C-1 | 0 | Stringy | Very soft | Moderate | Do. |
| A-2 | 40 | Smooth | Soft | Slight | Homogeneous paste. |
| B-2 | 40 | | Thick liquid | | Homogeneous liquid. |
| C-2 | 40 | Stringy | Fluent | | Partial separation. |

All of these samples were blackened, apparently unstable to light.

9. SODIUM ALGINATE+CALCIUM BENZOATE—7.5% OF THEORETICAL

| Test No. | Heat, Days | Spread | Firmness | Resilience | Structure |
|---|---|---|---|---|---|
| A-1 | 0 | Smooth | Soft | Low | Homogeneous paste. |
| B-1 | 0 | Grainy | Very soft | High | Uneven consistency. |
| C-1 | 0 | Lumpy | Soft | Low | Homogeneous jelly. |
| A-2 | 40 | Smooth | Firm | ---do--- | Homogeneous paste. |
| B-2 | 40 | Very lumpy | ---do--- | High | Homogeneous jelly. |
| C-2 | 40 | Lumpy | ---do--- | ---do--- | Do. |

All of these samples were increased in firmness by heating and all were heat-stable.

10. AMMONIUM ALGINATE+CALCIUM BENZOATE—13% THEORETICAL

| Test No. | Heat, Days | Spread | Firmness | Resilience | Structure |
|---|---|---|---|---|---|
| A-1 | 0 | Smooth | Soft | None | Homogeneous paste. |
| B-1 | 0 | Lumpy | ---do--- | Moderate | Blobs of gel. |
| C-1 | 0 | ---do--- | Firm | High | Flocculent. |
| A-2 | | Smooth | Fluent | None | Homogeneous paste. |
| B-2 | | Lumpy | Firm | Moderate | Uneven consistency. |
| C-2 | | Grainy | Semifluid | ---do--- | Gel separating. |

The B sample increased in firmness on heating while the A and C samples decreased. There was no change in structure of the A sample while the B and C samples separated appreciably on heating.

The results of the above experiments demonstrate that by dissolving the solid algin in a previously formed, clear solution of the coagulating salt a product is obtained which differs in type from that yielded by the older methods, in which the coagulating salt is dissolved in a previously formed solution of the algin. The products of the new method are characteristically of a short, pasty consistency while those of the older methods are characteristically resilient jellies, down to the point at which all semblance of firmness is lost. For pharmaceutical and similar purposes the difference in spreadability is governing as to the respective values of the products.

The greater stability to heating, which merely exaggerates the normal rate of breakdown at lower temperatures and points to much longer shelf life, is also strongly in favor of the products of the new method, this advantage appearing particularly where the coagulating salt is a salt of a weak acid with a strong base.

The water-soluble alginates are capable of forming very viscous solutions and such solutions are readily and smoothly spreadable though it is impossible in practice to carry them beyond the point of slow fluency. Such solutions, however, are not adapted to pharmaceutical use because of their relatively great instability. This is illustrated in the two experiments recorded in Table 3 below, in which the "A" samples were made by the method of the invention while the "D" samples consist of the algin solution alone, no salt being added.

Table 3

11. TRIISOPROPANOLAMINE ALGINATE+CALCIUM BENZOATE

| Test No. | Heat, Days | Spread | Firmness | Resilience | Structure |
|---|---|---|---|---|---|
| A-1 | 0 | Smooth | Soft | None | Homogeneous paste. |
| D-1 | 0 | do | Thick liquid | do | Liquid. |
| A-2 | 25 | do | Soft | do | Homogeneous paste. |
| D-2 | 25 | | Thin liquid | | Water thin liquid. |

12. BUTYLAMINE ALGINATE+CALCIUM BENZOATE

| A-1 | 0 | Smooth | Soft | None | Homogeneous paste. |
|---|---|---|---|---|---|
| D-1 | 0 | do | Thick liquid | do | Liquid. |
| A-2 | 25 | do | Very soft | do | Homogeneous paste. |
| D-2 | 25 | | Thin liquid | | Water thin liquid. |

The consistency of the A samples was only slightly reduced by heating while the D (algin) samples completely lost their viscosity.

The improved stability of the new products at relatively low pH value, and also the unsuitability of the relatively insoluble calcium salts for the purpose of the invention, are illustrated by the experiments of which the results are set forth in the table below:

Table 4

11. SODIUM ALGINATE+CALCIUM BENZOATE—pH 6.8

| Test No. | Heat, Days | Spread | Firmness | Resilience | Structure |
|---|---|---|---|---|---|
| A-1 | 0 | Smooth | Soft | Low | Homogeneous paste. |
| B-1 | 0 | Grainy | Very soft | High | Uneven consistency. |
| C-1 | 0 | Lumpy | Soft | do | Do. |
| A-2 | 40 | Smooth | Firm | Low | Homogeneous paste. |
| B-2 | 40 | Very lumpy | do | High | Do. |
| C-2 | 40 | Lumpy | do | do | Do. |

12. SODIUM ALGINATE+CALCIUM BENZOATE—pH 4.5

| A-1 | 0 | Smooth | Firm | Low | Homogeneous paste. |
|---|---|---|---|---|---|
| B-1 | 0 | Lumpy | Tough | High | Homogeneous jelly. |
| C-1 | 0 | do | do | do | Do. |
| A-2 | 11 | Smooth | Firm | Low | Homogeneous paste. |
| B-2 | 11 | do | do | High | Partly separated. |
| C-2 | 11 | do | Very soft | Low | Do. |

13. SODIUM ALGINATE+CALCIUM CITRATE—pH 6.8

| A-1 | 0 | Lumpy | Firm | Moderate | Uneven consistency. |
|---|---|---|---|---|---|
| B-1 | 0 | do | Tough | High | Do. |
| C-1 | 0 | do | do | do | Do. |
| A-2 | 30 | Smooth | Soft | None | Water separated. |
| B-2 | 30 | Lumpy | Firm | Moderate | Do. |
| C-2 | 30 | None, lumps | Tough | High | Homogeneous jelly. |
| | Cold | | | | |
| A-3 | [1] 30 | | | | Separated completely. |
| B-3 | [1] 30 | | | | Do. |
| C-3 | [1] 30 | | | | Do. |

14. SODIUM ALGINATE+CALCIUM CITRATE—pH 4.5

| A-1 | 0 | Granular | Firm | Moderate | Homogeneous jelly. |
|---|---|---|---|---|---|
| B-1 | 0 | Lumpy | Tough | High | Do. |
| C-1 | 0 | do | do | do | Do. |
| A-2 | 2 | | | | Separated. |
| B-2 | 2 | | | | Do. |
| C-2 | 2 | | | | Do. |

[1] 30 days at atmospheric temperature.

In the use of the readily soluble benzoate at pH 6.8, all of the products are stable to heating, which actually improves the homogeneity of the B and C products, probably by accelerating the otherwise very slow reaction. At pH 4.5, however, only the A product is stable, the B and C products showing clear signs of breakdown in eleven days.

In the use of the slightly soluble citrate, no smooth nor homogeneous product was obtained at pH 6.8 though acidification to pH 4.5 improved all of the products in that respect, probably in accelerating the release of calcium ions. All of the calcium citrate products, at high or low pH, were highly unstable to heat and broke completely in thirty days storage at atmospheric temperature.

We claim as our invention:

1. The method of producing readily spreadable pharmaceutical pastes and the like which comprises: dissolving a comminuted, solid, water-soluble alginate in a highly diluted aqueous solution of a readily water-soluble salt of a metal of which the alginate is water-insoluble, the quantity of said solid alginate being in excess of the stoichiometric equivalent of the metal of said salt.

2. A method as defined in claim 1, in which said solution of a salt is free from insoluble alginates prior to the addition of said soluble alginate thereto.

3. A method as defined in claim 1, in which the step of dissolving the solid alginate in the aqueous salt solution is performed by dispersing said solid alginate in said salt solution and maintaining said solid alginate in suspension until it has dissolved.

4. A method as defined in claim 1, in which the step of dissolving the solid alginate in the aqueous salt solution is performed by selecting a salt which is more readily soluble than said solid alginate and dispersing in water a pulverulent mixture of said selected salt and said solid alginate.

5. A method as defined in claim 1, in which said salt is a salt of calcium.

6. A method as defined in claim 1, in which said salt is a salt of an organic acid having a dissociation constant not exceeding $1.55 \times 10^{-4}$.

7. A method as defined in claim 1, in which said salt is a calcium salt of an organic acid having a dissociation constant not exceeding $1.55 \times 10^{-4}$.

8. A method as defined in claim 1, in which said salt is calcium lactate.

9. The method of producing readily spreadable pharmaceutical pastes and the like which comprises: dissolving a comminuted, solid, water-soluble alignate in a highly diluted aqueous solution of a readily water-soluble salt of a metal of which the alginate is water-insoluble, the quantity of said solid alginate being not less than two stoichiometric equivalents of the metal of said salt.

10. The method of producing readily spreadable pharmaceutical pastes and the like which comprises: dissolving a comminuted, solid, water-soluble alginate in a highly diluted aqueous solution of a readily water-soluble salt of a metal of which the alginate is water-insoluble, the concentration of said salt in said aqueous solution being not to exceed 1 percent by weight and the salt used being completely soluble in water at said 1 percent concentration.

11. An algin product characterized by a short, pasty, salve-like consistency, by freedom from resilience and by a high degree of stability, said product consisting essentially of water, a water-insoluble alginate, a water-soluble alginate and a water-soluble salt other than said soluble alginate, said other salt being nonreactive with either of said alginates, the quantity of said other salt being the stoichiometric equivalent of the metal of said water-insoluble alginate, and the quantity of said soluble alginate in said product being not less than one stoichiometric equivalent of the metal of said water-insoluble alginate.

12. A product as described in claim 11, in which said water-insoluble alginate is calcium alginate.

13. A product as described in claim 11, in which said salt other than said soluble alginate is a salt of an organic acid having a dissociation constant not exceeding $1.55 \times 10^{-4}$.

14. A product as described in claim 11, in which said salt other than said soluble alginate is a salt of lactic acid.

15. An algin product characterized by a short, pasty, salve-like consistency, by freedom from resilience and by a high degree of stability, said product consisting essentially of water, a water-insoluble alginate, a water-soluble alginate and a water-soluble salt other than said soluble alginate, said other salt being nonreactive with either of said alginates, the quantity of said other salt being the stoichiometric equivalent of the metal of said water-insoluble alginate, and the quantity of said soluble alginate in said product being not less than one nor more than nine stoichiometric equivalents of the metal of said water-insoluble alginate.

16. A composition adapted to form a stable pharmaceutical paste when dispersed in water, consisting essentially of a comminuted, solid, water-soluble alginate in admixture with a dry, powdered salt of a metal of which the alginate is water-insoluble, said salt being more readily water-soluble than said solid alginate and the quantity of said solid alginate being in excess of the stoichiometric equivalent of the metal of said salt.

ARNOLD B. STEINER.
LLOYD B. ROTHE.

References Cited in the file of this patent

UNITED STATES PATENTS

| Number | Name | Date |
|---|---|---|
| 2,420,308 | Gates | May 13, 1947 |

FOREIGN PATENTS

| Number | Country | Date |
|---|---|---|
| 359,302 | Germany | Sept. 19, 1922 |
| 555,940 | Great Britain | Sept. 14, 1943 |

OTHER REFERENCES

Lesser Drug and Cosmetic Industry December 1947, pages 761 to 762, 842 to 847.